United States Patent [19]

Land

[11] 4,042,760
[45] Aug. 16, 1977

[54] FLAT BATTERY

[75] Inventor: Edwin H. Land, Cambridge, Mass.

[73] Assignee: Polaroid Corporation, Cambridge, Mass.

[21] Appl. No.: 564,227

[22] Filed: Apr. 2, 1975

[51] Int. Cl.$^2$ .................................... H01M 6/46
[52] U.S. Cl. ................................ 429/162; 429/199; 429/200; 429/201; 429/229; 429/232
[58] Field of Search ............... 136/111, 175, 138, 10, 136/108, 134–135, 10; 429/162, 199, 200, 201, 209, 229, 232

[56] References Cited

U.S. PATENT DOCUMENTS

| | | | |
|---|---|---|---|
| 3,694,268 | 9/1972 | Bergum | 136/111 X |
| 3,697,328 | 10/1972 | Bilhorn | 136/111 X |
| 3,723,181 | 3/1973 | Oakley | 136/111 X |
| 3,770,504 | 11/1973 | Bergum | 136/10 |
| 3,833,427 | 9/1974 | Land et al. | 136/111 |
| 3,880,672 | 4/1975 | Megahed et al. | 136/111 |

Primary Examiner—Anthony Skapars
Attorney, Agent, or Firm—Gerald L. Smith; Stanley H. Mervis

[57] ABSTRACT

A planar primary battery particularly suited for a photographic application characterized in exhibiting high current drain capacities and improved manufacturability. The battery structure incorporates at least one electrode present in aqueous slurry form as a particulate dispersion of active material and an inorganic particulate additive in combination with electrolyte. This slurry combination, functioning in the absence of dispersing or binding agents present in the form of hydrophilic polymers and the like, provides for batteries exhibiting enhanced performance characteristics.

24 Claims, 9 Drawing Figures

| BATTERY LOT | INITIAL OCV | INITIAL CCV | SUBSEQUENT OCV | SUBSEQUENT CCV |
|---|---|---|---|---|
| A — FIG. 2 (112 DAYS) | 6.38 | 5.89 | 6.19 | 2.55 |
| | 6.52 | 5.97 | 6.35 | 5.26 |
| | 6.51 | 5.95 | 6.34 | 5.01 |
| B — FIG. 5 (119 DAYS) | 6.52 | 6.04 | 6.36 | 5.84 |
| | 6.52 | 6.05 | --- | --- |
| | 6.51 | 6.02 | 6.37 | 5.80 |
| | 6.51 | 6.04 | 5.96 | 0.65 |
| C — FIG. 5 (119 DAYS) | 6.49 | 5.97 | 6.35 | 5.78 |
| | 6.49 | 6.01 | 6.36 | 5.76 |
| | 6.50 | 6.02 | 6.36 | 5.77 |
| | 6.48 | 5.98 | 6.34 | 5.72 |
| D — FIG. 5 (109 DAYS) | 6.56 | 6.05 | 3.83 | 0.11 |
| | 6.55 | 6.04 | 6.39 | 5.86 |
| | 6.55 | 6.05 | 6.40 | 5.87 |
| | 6.53 | 6.04 | 6.38 | 5.85 |
| E — FIG. 7 (112 DAYS) | 6.42 | 5.70 | 6.59 | 5.62 |
| | 6.42 | 5.50 | 6.30 | 5.67 |
| F — FIG. 4 (125 DAYS) | 6.53 | 6.03 | --- | --- |
| | 6.53 | 6.00 | 6.25 | 5.63 |
| | 6.45 | 5.97 | 6.27 | 5.65 |
| | 6.55 | 5.87 | 6.27 | 5.64 |
| | 6.55 | 5.95 | 6.28 | 5.63 |
| | 6.56 | 5.99 | 6.29 | 5.60 |
| | 6.54 | 5.98 | 6.28 | 5.62 |

FIG. 9

FLAT BATTERY

BACKGROUND OF THE INVENTION

This invention relates to electrical energy power supplies and, more particularly, to battery power supplies of flat configuration.

Batteries formed having a flat, multicell configuration have been recognized as having considerable utility as a power source for advanced, consumer and industrial products. For instance when efficiently designed and fabricated, the power source may exhibit a relatively low internal impedance as well as a relatively high current output capacity. These desirable powering characteristics, when coupled with a generally flat geometric configuration, ideally lend such power supplies to a use in complement with compact but sophisticated electronically controlled instruments and devices.

As an example of such a union of components, flat primary batteries have been combined with the photographic film packs employed exclusively in a photographic camera sold by Polaroid Corporation of Cambridge, Mass., U.S.A., under the trademark "SX-70". Described, for instance, in U.S. Pat. Nos. 3,705,542; 3,543,662; 3,543,663; and 3,595,661, the film packs are formed comprising a disposable cassette structure containing a dark slide for covering an exposure station in a forward wall thereof, a stack of individual self-developing film units positioned behind the dark slide, a spring platen for urging the film units toward the forward wall to position the uppermost one of the film units in the stack at the exposure station and a flat battery positioned opposite to the platen having adjacent terminal surfaces of opposed polarity which are accessible from the rearward wall of the cassette. Thus configured, the film pack is ideally suited as a component within a photographic system incorporating a highly automated camera of complementing compact configuration. Such a camera may include integrated solid state control circuits as detailed in U.S. Pat. No. 3,774,516 which serve a myriad of functions including the control of tractive electromagnetic drives as described, inter alia, in U.S. Pat. Nos. 3,791,278; 3,750,543; 3,805,204; and 3,820,128. Additionally, the power supply provided the camera permits a utilization of dynamoelectric motor drives and the like as disclosed, for instance, in U.S. Pat. Nos. 3,811,081 and 3,731,608.

For practical utilization, the flat battery structures should be capable of exhibiting efficient performance characteristics without the external application of compressive forces. Alternatives to otherwise necessary compression deriving techniques generally have looked to the incorporation of adhesives, particularly between particulate active electrode materials and current collector surfaces. For instance, in U.S. Pat. No. 3,770,504 particulate electrode material for association with a carbon impregnated polymeric current collector surface is provided with adhesives which generally are insulative in character. The resultant patch-type electrode structures typically are performed upon the collector surfaces prior to battery manufacture. These assemblies subsequently are combined in combination with gel electrolyte material and the like to form laminar pile or battery assemblies in continuous web fashion. Desired adhesion of the electrode materials with the collector surfaces, while providing necessary association therebetween, tends to derogate the efficiency thereof inasmuch as chemical activity of the battery necessarily is hindered by the adhesive lattice within which the electrode particles are embedded.

A flat battery structure from which considerably enhanced current drain capacities are avilable is described in copending application of S. A. Buckler, Ser. No. 495,681, filed Aug. 8, 1974, entitled "Flat Battery" (now abandoned) and assigned in common herewith. This battery includes both positive and negative active components in an aqueous slurry form as particulate dispersions with electrolyte and a hydrophilic polymeric binder or dispersant. The electrode particles within the slurry are present in a concentration per unit area which is effective to provide an electrically conductive dispersion and, in consequence of the higher surface availability of electrode materials within the electrochemical system, batteries of a desirably broad range of current capacities are readily designed and manufactured. For instance, one such manufacturing technique, described in copending U.S. application for U.S. patent by O. E. Wolff, Ser. No. 514,458, filed October 15, 1974 and entitled "Method of Forming A Slurry Battery Cell," (now abandoned in favor of a continuation-in-part thereof, Ser. No. 694,026 filed June, 7, 1976) also assigned in common herewith, describes that the slurry battery structures may be formed in situ as a step in fabrication of a laminar pile assembly.

In a copending application for U.S. Patent, Ser. No. 495,628, filed Aug. 8, 1974, by E. H. Land, entitled "Flat Battery" (now abandoned in favor of a continuation-in-part thereof, Ser. No. 647,590 filed Jan. 8, 1976, now U.S. Pat. No. 4,007,472 issued Feb. 8, 1977) and assigned in common herewith, another flat battery structure of enhanced output capacity is described as incorporating a laminar cell structure having a planar cathode assembly including a current collector carrying on one surface, in order, a first cathode mix comprising a particulate dispersion of cathode mix particles in a binder matrix and a second cathode mix comprising a particulate dispersion of cathode mix particles with hydrophilic binder disposed within aqueous electrolyte, i.e., in slurry form. In this hybrid form of slurry electrode structure, a highly desired improved shelf-life characteristic is evidenced in combination with the noted advantageous higher output capacity.

As may be evidenced from the foregoing, highly desirable in the flat battery field is a structure which enjoys the considerably enhanced fabricability and output capacity of a slurry type electrode system as well as evidences an enhanced interaction between active electrode material and associated collector surface. Where such association is available, improved shelf life, output capacity and fabricability characteristics are realized.

SUMMARY

The present invention is addressed to a flat battery structure of improved reliability and performance. Incorporating at least one electrode having a slurry component, the new structure is characterized by the absence of hydrophilic polymeric binders and the like within the slurry format as well as the absence of specific adhesive coatings intermediate the active component and an associated collector surface.

The enhanced characteristics of the battery cells have been achieved as a result of the discovery that a substantially non-conductive inorganic particulate additive, when dispersed within the active material-electrolyte slurry of the structures, serves to promote the adhesion of the slurry format with associated current collector surfaces while imposing no hindrance to ionic conduction within the electrochemical system. An inorganic additive found highly successful in carrying out the instant invention is titanium dioxide.

Another feature and object of the invention is to provide a planar primary battery of a variety having at least one cell including positive and negative electrodes and a planar electrolyte ion permeable separator positioned therebetween. In one embodiment, the negative electrode of the cell structure includes a planar anode current collector carrying, on one surface, an aqueous slurry of active material particles and an inorganic, substantially non-conductive particulate additive present in uniform distribution with aqueous electrolyte, no polymeric dispersants or binding material being present in the structure. Alternately, the negative electrode of the cell may be formed including a planar anode current collector carrying on one surface, in order, a first anode particulate dispersion of metallic anode particles in a binder matrix, and a second anode particulate dispersion of metal anode particles as well as a particulate, substantially non-conducting inorganic additive, the dispersion being disposed within aqueous electrolyte.

As another feature of the invention, a planar primary battery of a variety having at least one cell including positive and negative electrodes and a planar electrolyte ion permeable separator positioned therebetween is provided wherein the cell structure includes a positive electrode comprising a planar cathode current collector and a cathode mix formed having a particulate dispersion of both cathode mix particles and a substantially non-conducting particulate inorganic additive, the dispersion being disposed within aqueous electrolyte in the absence of a hydrophilic polymeric binding or dispersing agent. As an alternate embodiment of the structure, the positive electrode may be formed in a manner wherein the planar cathode current collector carries on one surface, in order, a first cathode mix comprising a particulate dispersion of cathode mix particles in a binder matrix and a second, slurry-type, cathode mix comprising a particulate dispersion of cathode mix particles as well as a substantially non-conducting particulate inorganic additive disposed within aqueous electrolyte.

The invention further contemplates the provision of planar primary batteries having cell structures representing combinations of the above-outlined slurry systems with conventional patch-type electrodes. With each of these multiple embodiments, the above-described desirable manufacturing aspects inherent in slurry flat battery systems are retained.

Other objects of the invention will in part be obvious and will in part appear hereinafter.

The invention accordingly comprises the product possessing the construction, combination of elements and arrangement of parts which are exemplified in the following detailed disclosure.

For a fuller understanding of the nature and objects of the invention, reference should be had to the following detailed description taken in conjunction with the accompanying drawings.

DETAILED DESCRIPTION

Figure 1:
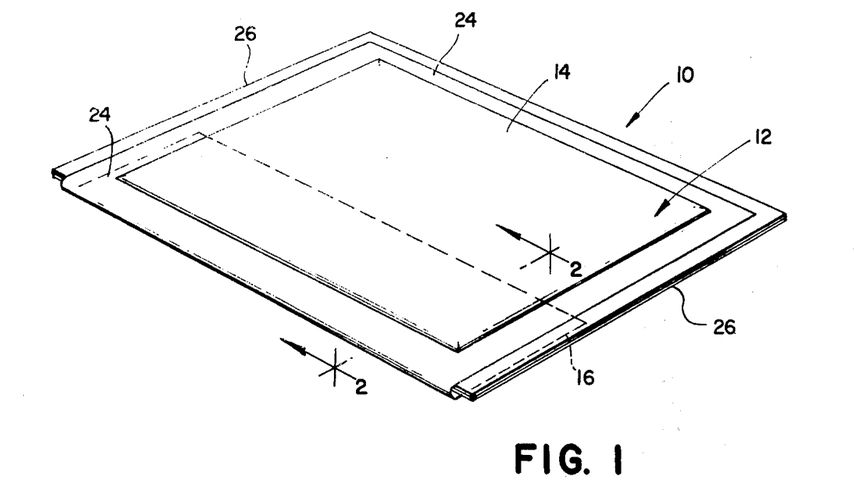
FIG. 1 is a perspective view of a flat primary battery structure according to the invention.

A multicell flat battery structure is presented generally at 10 in FIG. 1 as it would appear in an electrochemically active state following component buildup and prior to final packaging. Features of the battery structure apparent from this perspective view include an upwardly disposed anode current collector assembly 12, the outwardly facing surface 14 of which is fashioned of a metal to serve as a terminal. Current collector assembly 12 is folded about one side of battery structure 10 such that the terminal defining portion 16 of surface 14, as revealed in FIG. 2 and in phantom in FIG. 1, is located on the lower side of the battery. A cathode electrode collector assembly 20 (shown in FIGS. 2 and 3) is provided as the lowermost component of the battery and includes, in similar fashion as assembly 12, a metallic outwardly facing surface portion 22 which also serves as a terminal surface for the battery structure. With the geometry shown, cathode and anode terminals may be provided in convenient adjacency on one side of the pile assembly. The slightly depressed peripheral portion 24 of the assembly is occasioned from peripheral sealing procedures provided during assembly. This depression, as revealed in FIG. 2, necessarily becomes more exaggerated in a sectional view of the battery. Extending from the periphery of the battery and formed in the course of the sealing procedures, is an outer border seal 26 formed of a plurality of frame-type sealing elements which extend inwardly from the border portion shown to select laminar elements of the battery. This lamination, as at 26, is somewhat rigid, thereby enhancing the structural integrity of the flat battery configuration.

Figure 2:
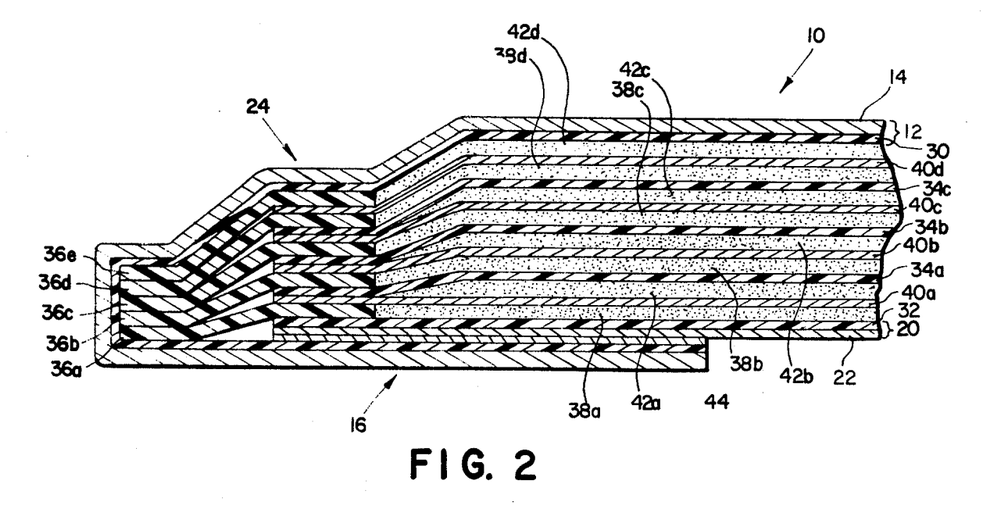
FIG. 2 is a sectional view of a battery structure in accordance with one embodiment of the invention taken through the plain 2—2 of FIG. 1.
Figure 3:
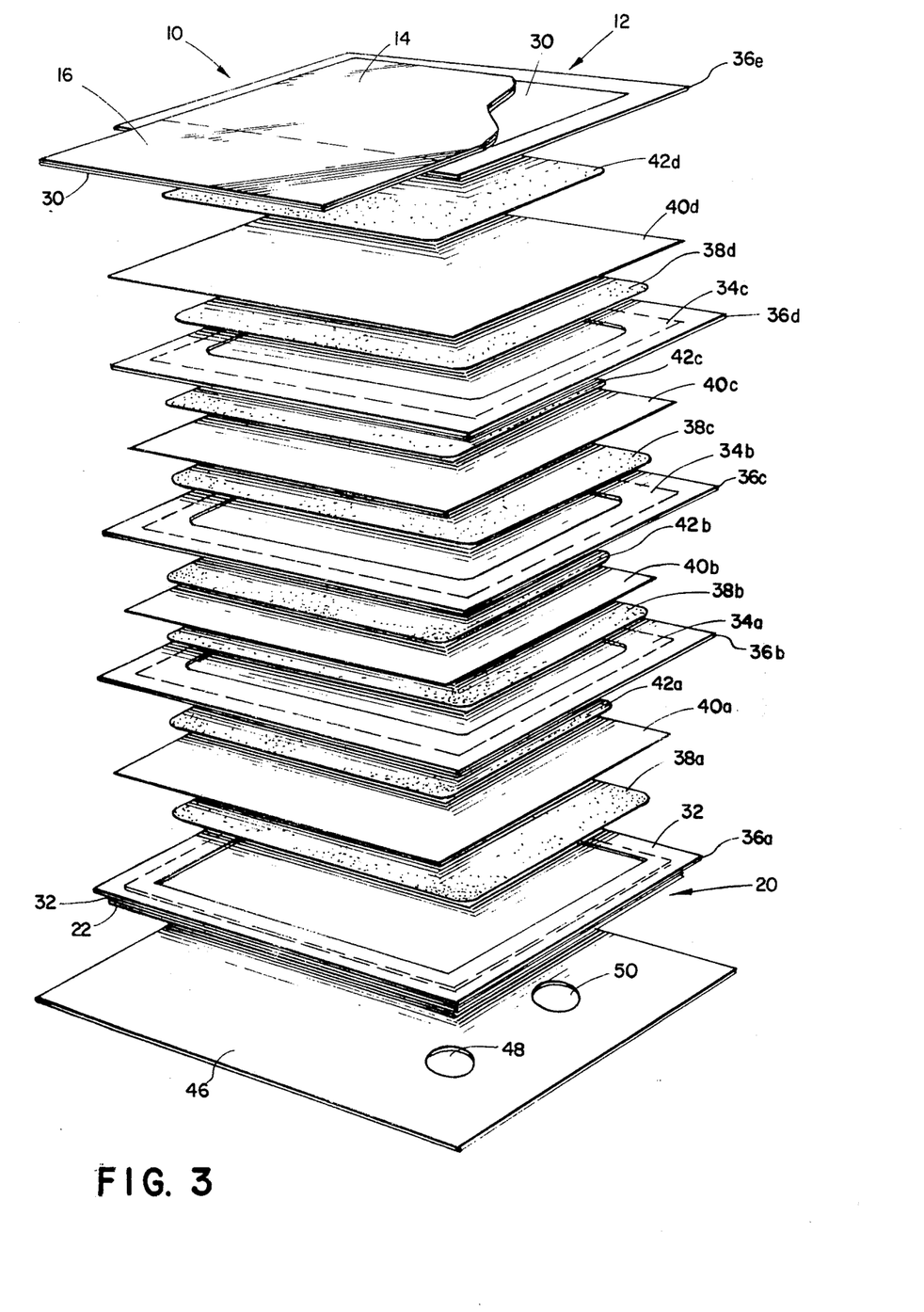
FIG. 3 is an exploded perspective representation of the components of the battery structure of FIG. 2, revealing the relative orientation of sheet-type components thereof.

Referring to FIGS. 2 and 3, the geometry or interrelationship of the discrete components forming one embodiment for battery pile 10 are revealed in detail. As described above, the exposed surfaces of the battery are present as an outer laminate of current collector assemblies 12 and 20. Prefabricated as discrete elements of the system, assemblies 12 and 20 are formed of a metallic sheet foil current collector which, in turn, is laminated to an internally disposed polymeric current collector. In this regard, assembly 12 is formed having a metallic surface current collector 14 serving as a terminal surface laminated with a polymeric current collector 30, while assembly 20 is formed having a metallic current collector outer terminal defining surface 22 laminated with polymeric current collector 32. Each of the metal current collectors 14 and 22 may be provided as an annealed tin coated steel sheet, however, they also may be formed of aluminum or lead sheet material and are preferably on the order of less than 10 mils. in thickness for batteries configured, for instance, for photographic utilization. Polymeric current collectors 30 and 32 may comprise a non-conductive matrix, for instance, of a thermoplastic material so thoroughly impregnated with conductive particles, typically carbon, as to be somewhat unidirectionally conductive. For example, the polymeric layers of the battery may be present as an electrically conductive carbon-impregnated vinyl film sold under the trade designation "Condulon" having a thickness on the order of about 2 mils. for the noted photographic application. As is apparent, the assemblies are prelaminated together prior to their assembly within the battery pile. Collector sheets 30 and 32 generally are impervious to electrolyte, are electrochemically inert and are characterized in exhibiting a low resistance to the flow of current from one face to the opposite face thereof. Accordingly, discrete sheets of this same material may be utilized for geometric cell definition and, additionally, as intercell connectors within a series build-up of cells forming a primary battery pile structure.

Looking to the general build-up of the pile structure, battery 10 is seen to be formed of four serially associated cell units which are electrically coupled but chemically isolated by intercell connectors 34a–34c. The intercell connectors, preferably, are formed as discrete rectangular sheets of electrically conductive carbon-impregnated polymeric film, as described earlier in connection with collector sheets 30 and 32, and, for the noted application, have a thickness on the order of about 2 mils. The peripheral integrity of the entire pile structure is provided by a sequence of frame-shaped border seals designated generally at 36a–36e. Being mutually identically dimensioned, frames 36a–36e are formed having inner borders which define rectangular inner openings which mutually cooperate to form the peripheries of individual cell cavities. Additionally, each of the frames is dimensioned such that it extends beyond the periphery of an associated polymeric intercell connector 34a–34c as well as the polymeric surface portion 32 of assembly 20. As revealed in FIG. 3, the frame 36e extends outwardly from three edges of assembly 20. Frames 36a–36e are continuous and preferably are formed of a material heat sealable both along their commonly juxtaposed surfaces in the final pile structure as well as with polymeric collector sheets 30, 32 and 34a–34c. Material for the frames should be electrolyte impervious, remaining inert to the chemical activity of the battery structure. Generally, frames 36a–36e may be formed of polyvinyl chloride having a thickness, for typical applications, of about 5 mils.

The embodiment of the invention to be described in connection with FIGS. 2 and 3 is one wherein a slurry electrode structure is present both at the anode and cathode of each cell within the laminar pile. Inasmuch as the general structure of the battery pile, as it relates to collector assemblies, intercell connectors, separators and packaging may remain the same for all embodiments, the entire structure is illustrated only once in these figures of the drawings. Variations from this basic structure are revealed later herein in partial section utilizing common numeration to identify components common to all embodiments. For example, other advantageous combinations of slurry and patch-type electrode pile structures are described in connection with later figures.

To form an initial one of the pile cell structures, an initial collector assembly, for instance, cathode collector assembly 20, may be performed as a discrete assembly and a frame member 36a may be bonded thereto as described above. Over this subassembly is deposited, for instance by extrusion, a positive aqueous slurry which is present as a particulate dispersion of cathodic mix particles and an inorganic particulate additive, the combination being uniformly dispersed with aqueous electrolyte. Note the absence of hydrophilic polymer as a binding agent of dispersant within the slurry. In the embodiment illustrated, the battery 10 incorporates a Le Clanche electrochemical system, accordingly, the cathodic material will be present as a particulate dispersion of manganese dioxide and carbon and the additive preferably is particulate titanium dioxide. The electrolyte within the dispersion may include aqueous ammonium chloride, zinc chloride and, additionally, a small amount of mercuric chloride. As alluded to hereinabove, the incorporation of the inorganic particulate additive, i.e., titanium dioxide, and exclusion of hydrophilic polymeric binding agents has been discovered to considerably enhance the cohesiveness of the deposited slurry mix as well as provide considerably improved adhesion of the slurry mix to the associated polymeric current collector. Preferably, the amount of carbon particles provided within the cathode mix is held to the minimum value required for effecting appropriate electrical conductivity between the manganese dioxide component and the surface of the polymeric collector. It is believed, but not necessarily required, that many typical hydrophilic polymeric dispersions or binder agents otherwise incorporated within the slurries tend to inhibit electronic transmission between the conductive plastic and the cathodic electrochemical system. A further advantage of the slurry structure described resides in the absence of bubble formation in the course of fabricating the pile structure. Accordingly, the provision of an additive such as titanium dioxide within the slurry structure serves to both disperse the manganese dioxide agent thereof while permitting an enhancement of the contribution thereof within the system both with respect to the interaction thereof with the electrolyte and association with the surface of the polymeric collector. Weight ratios of manganese dioxide to carbon constituents within the slurry mix have been found acceptable from about 6:1 to 12:1, a ratio of 8:1 generally being utilized depending upon the type carbon present. Additionally, the titanium dioxide may be present in the slurry structure in a weight-to-weight ratio with respect to the carbon content of about 4:1 for the 8:1 ratio noted above with respect to the manganese dioxide and carbon constituents. The quantities of these constituents, of course, may be varied to derive a particularly desired battery performance. For instance, higher capacities may be realized through the incorporation of added amounts of the active electrode material, manganese dioxide.

The deposited positive aqueous slurries are represented in the drawings at 38a–38d. Note that the slurry, as at 38a, is deposited over the surface of a polymeric collector 32 and corresponding cathodic slurries 38b–38d are located for contact with an upwardly extending surface of an appropriate intercell connector sheet 34a–34c. With the arrangement, the contacting polymeric surface serves as a current collector for the associated positive electrode structure.

Upon deposition of cathodic slurry 38a, for instance by extrusion, a selectively dimensioned sheet of battery separator material 40a is positioned thereover. This material is selected as being wettable by the slurry depositions with which it is in contact as well as being ionically permeable. Additionally, the material should exhibit a texture or porosity, the interstitial openings or channels of which are of adequately fine geometry or size to assure that no migration of the particulate matter of the slurries from one electrode environment to another may occur. Among the materials conventionally used as separators mentioned may be made of fibers and cellulosic materials, woven or nonwoven fibrous materials such as polyester, nylon, polypropylene, polyethylene or glass. Specifically, a Kraft paper having a thickness of about 2.0 mils. has been found to be adequate for typical applications. As shown in FIGS. 2 and 3, separator 40a as well as separators 40b–40d are dimensioned as having the same peripheral shape and size as polymeric collector 20 or intercell connectors 34a–34c. In this regard, note that the separators are dimensioned such that their peripheries extend over the inner rectangular openings defined by the inner borders of frames 36a–36e.

The associated anode for the initial cell of the pile structure illustrated is represented by a slurry positioned to adhere to one surface of intercell connector 34a opposite and generally coextensive with the deposition of cathodic slurry 38a. As in the case of the cathode slurries, the anode slurry, as at 42a, may be deposited utilizing positive displacement techniques, doctoring, silk screening or the like, however, manufacturing advantage may be achieved inasmuch as the slurry may be formulated having a consistency permitting its deposition by extrusion.

Negative electrode slurries 42a–42d comprise a particulate dispersion of metallic anode particles disposed, in combination with an inorganic, substantially non-conducting particulate additive, as a substantially uniform dispersion within aqueous electrolyte. For a Le Clanche system, zinc particles are utilized as the active material and are present in a concentration per unit area effective to provide an electrically conductive dispersion thereof, while the electrolyte is present in intimate surface contact with the particles in a concentration rendering the slurry both workable and ionically conductive. A zinc particle size of, for example, about eight microns mean diameter may be utilized with the slurry. The inorganic additive utilized for the slurry preferably is present as particulate titanium dioxide and is present in a concentration effective to appropriately disperse the zinc particles while effecting a necessary adherence of the slurry structure to the associated polymeric current collector element, as at 34a. As before, the additive providing requisite viscosity for the slurry, in addition to its noted functions, has been observed to provide a slurry mixture evidencing an absence of bubble build-up or the like otherwise deleterious to the battery structure; serves to minimize shorting effects which may be present within the slurry structure and does not interfere with ion transmission within the electrochemical system of the cell structures.

The electrolyte utilized with negative aqueous slurries of the system ordinarily will comprise a conventional aqueous solution of ammonium chloride/zinc chloride with, where preferred, an addition of a small quantity of mercuric chloride as a corrosion inhibitor.

The first cell build-up is completed with the positioning in registry of intercell connector 34a over negative slurry deposition 42a. Intercell connector 34a is formed, as described above, incorporating a border sealing frame 36b the inner surface portion of which is thermally bonded to the outwardly disposed surface of the intercell connector sheet. Upon being so positioned to define the cell, the outer peripheral border surface portions of frame 36b are thermally bonded with the corresponding outer surface portion of frame 36a. In addition to serving as an intercell connector, sheet 34a also serves as the current collector for the negative electrode of the initial cell. Note that within the initial cell, separator 40a extends not only sufficiently to separate the electrode slurries 38a and 42a but also is configured to provide electrical separation of current collector sheets 32 and 34a and to extend over the thermal bonding surface between each frame member and its associated current collector sheet. With this arrangement, no inadvertent shorting effects or the like are likely to arise. Further, such geometry assures that no migration of the particulate dispersion of one electrode slurry into the opposite electrode slurry occurs.

To provide the multicellular pile structure, for instance, having four cells as illustrated in the drawings, the pile build-up is carried out in a sequence suited to the manufacturing technique desired. For instance, in one fabricating technique, the initial cell is fabricated as above by depositing cathode slurry 38a, following which separator 40a is positioned over and in appropriate registry with polymeric collector 32. Anode slurry material 42a then is deposited upon one surface of intercell connector 34a and the connector 34a as well as previously attached frame 36b is joined with collector assembly 20 and thermally bonded thereto at the adjoining surfaces of frames 36a and 36b. Cathode slurry material, as at 38b, then is deposited on one side of a next separator sheet 40b and the subassembly is placed in appropriate registry upon the opposite side of polymeric intercell connector 34a. Anode slurry composition then is deposited upon one side of another polymeric intercell connector 34b. Intercell connector 34b, including previously attached frame 36c then is placed over the subassembly including separator 40b, following which frame 36c is thermally bonded with frame 36b. This procedure essentially is reiterated until the entire pile structure, including anode current collector assembly 12, is attached. Following desired final thermal bonding of the entire stacked array of cells, extended portion 16 of collector assembly 12 is covered with an insulative tape 44 and wrapped around to the underside of the battery to provide for juxtaposed terminal defining surfaces. The battery assembly may then be mounted upon a supporting card as at 46 having apertures 48 and 50 preformed therein to provide access to the noted terminal defining surfaces. In providing for this mounting, an electrically insulative adhesive film may be applied over the battery and onto the available surface surrounding the periphery thereof. Such film provides an electrically insulative covering permitting serial stacking of the batteries for facilitating their subsequent handling.

Other constructional sequences will occur to those skilled in the art and, to a large extent, will depend upon the automated assembly system contemplated. One advantageous assembly technique provides for the application of all slurry components only upon polymeric collector subassembly surfaces, as opposed to the above-described application over sheet separator surfaces.

Figure 4:
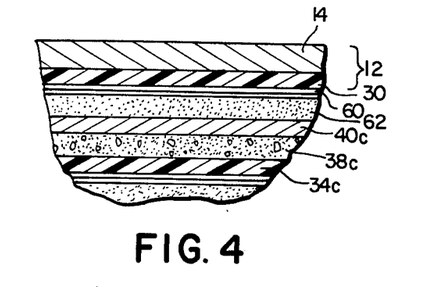
FIGS. 4–8 are partial sectional views of primary batteries having the same general supportive components as those revealed in FIGS. 1 and 2 but having electrochemically active structures representing different embodiments of the invention.

Referring now to FIG. 4, an alternate embodiment for a cell structure which may be utilized to form a multicell battery is revealed. Note that the section illustrates the uppermost cell of a pile structure formed including the general supportive or collector and separator components of the battery described in connection with FIGS. 2 and 3. While the structure includes a slurry type cathode 38c identical to that described in FIGS. 2 and 3, it utilizes an anode structure of conventional components. Described, for instance, in U.S. Pat. No. 3,770,504, the anode active material 60 is of a dry patch configuration formed, for instance, by predepositing anode material in the form of powdered zinc dispersed in a binder matrix. Accordingly, the particulate zinc component of the anode is adhesively adhered to an associated polymeric collector surface as at 30. The dry patch anode structure 60 is positioned within the cell structure in combination with a conventional gel electrolyte represented at 62. This electrolyte may utilize the conventional components described earlier, for instance, an aqueous solution of ammonium chloride/zinc chloride about 4:1 dispersed in a polymeric thickener such as hydroxyethyl cellulose, for example, on the order of about 5% or more. In addition, a small quantity of mercuric chloride may be present in the electrolyte as a corrosion inhibitor. The electrolyte may be deposited utilizing conventional positive displacement techniques, doctoring, silk screening or the like.

Figure 5:
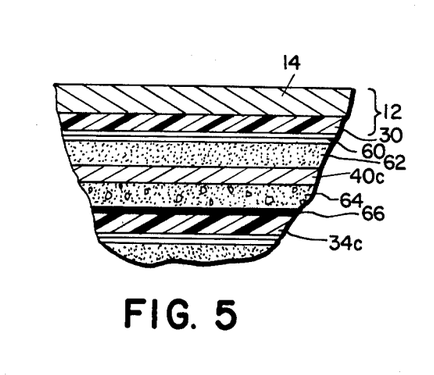

Looking to FIG. 5, still another embodiment of the cell structure of the invention is revealed. In this embodiment, an anode structure including dry patch metallic anode material 60 and electrolyte 62 are present in the same arrangement as described in connection with FIG. 4. However, a composite dry patch slurry cathode arrangement is present as a slurry deposition 64 positioned over a cathode dry patch 66. Manganese dioxide-carbon cathode dry patch 66 is preformed upon polymeric current collector material 34c utilizing an aqueous solution incorporating, for instance, a butyl rubber or the like binder as described in the above referenced U.S. Pat. No. 3,770,504. Following initial deposition, the aqueous phase of the binder solution is removed by heat induced vaporization. Generally a 25:1 ratio by weight of manganese dioxide to an acetylene-type carbon is utilized for such dry patch cathode structures. Cathode slurry 64 is formed in similar fashion as described in conjunction with FIGS. 2 and 3.

Figure 6:
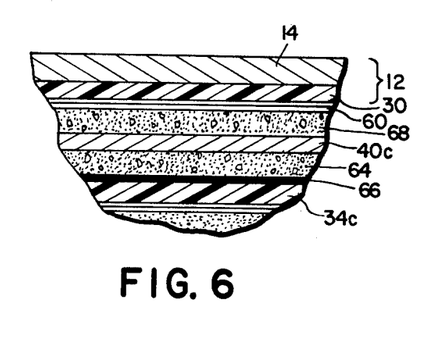

Looking at FIG. 6, another embodiment of the invention is revealed. As is apparent from the figure, this structure utilizes dry patch electrode structures 60 and 66 for initial anode and cathode coverings, respectively, of polymeric current collectors 30 and 34c. Additionally, the cell incorporates the present anode and cathode slurry components shown, respectively, at 68 and 64 in complement with the dry patch predepositions. Such multiple component structures may be found useful for applications requiring higher battery capacities.

Figure 7:
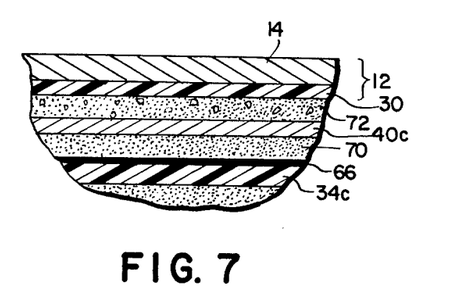

Referring to FIG. 7, still another embodiment of the invention is illustrated. Here, a conventional dry patch cathode structure 66 is utilized in conjunction with a conventional, non-slurry, gel electrolyte shown at 70. This electrolyte may have the composition described infra. The anode component of the cell is formed incorporating only a slurry composition 72 identical to that described in conjunction with FIGS. 2 and 3.

Figure 8:
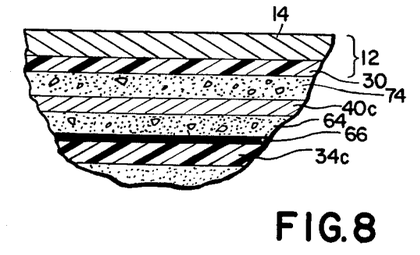

Looking to FIG. 8, a final embodiment for a cell structure according to the invention is shown. Note in the figure, that the cathode structure of the cell includes a slurry component 64 operating in conjunction with a dry patch cathode 66. The anode for the composite cell is formed purely as an anode slurry material 74. As in the case of the earlier embodiments, all slurries are configured as hereinabove described.

The above-described slurry type electrode compositions may be prepared utilizing a variety of combinations of constituents, the selection of which and amounts thereof being predicated upon the ultimate utilization for which the resultant structures are intended. The following formulation is exemplary of one positive slurry electrode:

| | |
|---|---|
| Titanium dioxide | 100 gm. |
| Magnesium dioxide | 200 gm. |
| Ammonium chloride | 33 gm. |
| Zinc chloride | 15 gm. |
| Water | 100 gm. |
| "Shawinegan Acetylene Black" (a carbon black sold by Shawinegan Products Corp. N.Y., N.Y.) | 25 gm. |

Negative slurry electrodes may, for example, be formulated by blending 4 gm. of mercuric chloride with 200 gm. of an aqueous solution of about 33 percent by weight ammonium chloride and about 15 percent zinc chloride. To this mixture is blended 125 gm. of titanium dioxide and 300 gm. of powdered zinc. Optionally, about 8 gm. of carbon black may be added to the mix.

Typical of dry patch electrode formulations are the following:

| | |
|---|---|
| Negative "dry patch" electrode: | |
| powdered zinc | 1000 gm. |
| carbon black | 5 gm. |
| "Polytex 6510" (an acrylic emulsion resin sold by Celanese Corp., Newark, N.J.) | 39.1 gm. |
| "Bentone LT" (An organic derivative of hydrous magnesium aluminum silicate, a product of National Lead Co., Inc. N.Y., N.Y.) | 0.62 gm. |
| tetra-sodium pyro phosphate | 0.25 gm. |
| water | 150 gm. |
| Positive "dry patch" electrode: | |
| particulate magnesium dioxide | 1000 gm. |
| "Shawinegan" black (a carbon black sold by Shawinegan Products Corp., N.Y., N.Y.) | 40 gm. |
| "BP-100" (a latex sold by Exxon Chemical Co., Houston, Texas) | 67.68 gm. |
| Ethylene diamine tetra-acetic acid (sold under the trade name "Versene" by Dow Chemical Co., Midland, Mich.) | 4.12 gm. |
| tetra-sodium pyro phosphate | 10 gm. |
| "Lomar D" (a dispersing agent sold by Nopco Chemical Co., Newark, N.J.) | 3.85 gm. |
| water | in sufficient quantity for deposition |

Subsequent to disposition of the initial material upon a collector surface the aqueous phase of the mixture is removed preferably by heat induced vaporization.

The gel electrolyte may be provided from formulations as follows (percent by weight):

| | |
|---|---|
| water | 58% |
| ammonium chloride | 20.92% |
| mercuric chloride | 2.09% |
| zinc chloride | 15.78% |
| hydroxyethyl cellulose | 3.20% |

As noted above and disclosed in the above-identified Applications for U.S. Ser. Nos. 495,628 and 495,681, it has been determined that somewhat optimum dry-patch type cathode structures are provided having manganese dioxide and carbon present, respectively, in a weight-to-weight ratio of 25:1. Where slurry cathode structures are provided, this ratio may vary from about 6:1 to 12:1, a preferred ratio being 8:1. As is apparent from the above formulations, it is desirable to provide the titanium dioxide additive in a 4:1 weight-to-weight ratio, respectively, with the carbon constituent.

It will be apparent that the particular structure for the pile assembly may be varied in accordance with a given design need. However, for all embodiments of cells utilizing a slurry component according to the invention, post fabrication inspection, for instance, by dissection of the cells, will reveal that the slurry, subsequent to its incorporation within the pile structure, assumes a cohesive mass configuration which advantageously adheres to associated polymeric current collector surfaces. As a consequence, a slurry system may be advantageously utilized within a flat battery structure without recourse to external compression techniques and the like to assure high quality performance.

Figure 9:
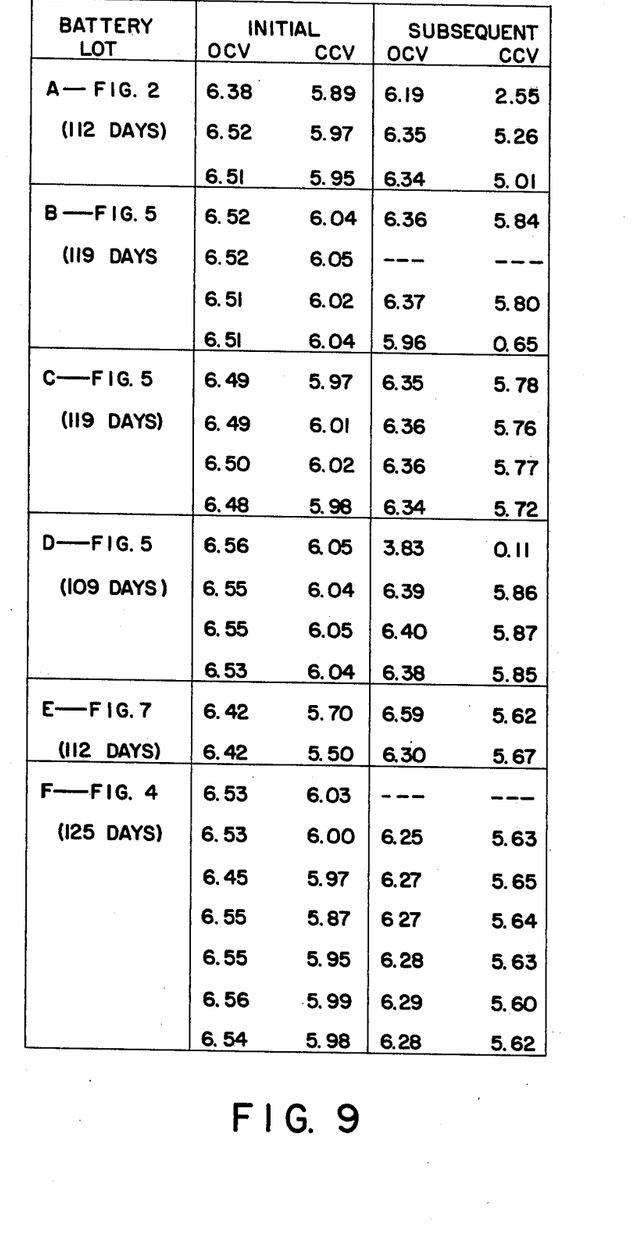
FIG. 9 is a tabulation of battery performance data.

Looking to FIG. 9, a compilation of open-current voltage (OCV) and closed circuit voltage (CCV) readings for certain lots of batteries fabricated substantially in accordance with the invention is revealed. These readings are categorized as "initial", i.e. at the time of battery fabrication, and "subsequent", i.e., following storage periods as designated at a temperature of about 75° F.

Lot A of the compilation represents readings taken for three batteries fabricated to have the structural arrangement of the embodiment of FIG. 2. In this regard, the batteries were formed having peripheral dimensions of about 2¾ × 3⅜ inches, incorporated Condulon (identified supra) polymeric intercell connector and collector components, thermally connected peripheral seals formed of polyvinyl chloride and separators formed of Kraft paper. The anode slurry constituents were formed from a mixture combining 130 ml. of a typical electrolyte, (an aqueous mixture incorporating about 21% by weight ammonium chloride and 16% by weight zinc chloride) with 4 gm. of mercuric chloride, 300 gm. of powdered zinc and 125 gm. of titanium dioxide.

The cathode slurry was formed by initially blending 100 gm. of titanium dioxide, 200 gm. manganese dioxide, 35 gm. ammonium chloride, 15 gm. zinc chloride and 100 ml of water. To the above, then was added 25 gm. of carbon and 0.5 ml of water. Deposition of the slurries was carried out by silk screening. Note that, following a 112-day storage interval, two of the three batteries maintained acceptable voltage ratings.

Lot B of the compilation represents readings for four batteries fabricated to have the structure of FIG. 5 and utilizing the same components of containment and support as are identified above in connection with Lot A. Cathodes for the batteries combined patch components as described hereinabove with cathode slurry provided by silk screening from a mixture of 33 gm. ammonium chloride, 3 gm. mercuric chloride, 140 ml water, 100 gm. manganese dioxide and 25 gm. carbon. Anodes for the batteries were of the patch variety described hereinabove combined with a conventional electrolyte, also as described hereinabove.

Lot C of the compilation represents readings from batteries constructed, as in the case of all lots, in identical fashion as those of Lot B.

Batteries representing Lot D were fabricated having the same constituents as Lot C, however, no mercuric chloride was present within the cathode slurry.

Lot E of the compilation provides storage data for batteries formed having a slurry anode in combination with a conventional, patch-type cathode. The anode slurries were deposited from a mix composed of 300 gm. of powdered zinc, 125 gm. of titanium dioxide, 4 gm. of mercuric chloride and 200 gm. of aqueous electrolyte including about a 21% by weight content of ammonium chloride and about 16 weight percent zinc chloride. The patch-type cathodes were formed substantially as described hereinabove and utilized the typical gel electrolyte described hereinabove. Note the excellent shelf-life stability of this lot of batteries at 121 days.

The Lot F designated batteries incorporated the hereinabove described typical patch-type anodes, as in Lots B, C, and D in combination with a slurry cathode formed from a mix including 33 gm., ammonium chloride, 15 gm. zinc chloride, 3 gm. mercuric chloride, 25 gm. carbon, 25 gm. titanium dioxide, 200 gm. manganese dioxide and 104 ml water.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. In a planar battery of a variety having at least one cell including positive and negative electrodes and a planar electrolyte ion permeable separator positioned therebetween, the improvement wherein at least one of said electrodes is formed comprising:

a planar current collector having a surface for association with active electrode material; and an aqueous slurry of active electrode material particles in aqueous electrolyte, said slurry including an inorganic substantially nonconductive particulate dispersant.

2. The improved battery of claim 1, in which said dispersant is titanium dioxide.

3. The improved battery of claim 1 in which said aqueous slurry electrode is characterized by the absence of a hydrophilic binder agent.

4. The improved battery of claim 1 in which said dispersant is present in an amount effective to disperse said active electrode material particles and promote the adhesion thereof with said current collector surface.

5. The improved battery of claim 1 in which said active electrode material particles are manganese dioxide and carbon.

6. The improved battery of claim 5 in which said aqueous electrolyte includes ammonium chloride and zinc chloride.

7. The improved battery of claim 6 in which said dispersant is titanium dioxide.

8. The improved battery of claim 7 in which said manganese dioxide and carbon are present, respectively, in a weight-to-weight ratio from between about 6:1 and 12:1.

9. The improved battery of claim 8 in which said titanium dioxide is present with respect to said carbon in a weight-to-weight ratio of about 4:1.

10. The improved battery of claim 1 in which said active electrode material particles are zinc.

11. The improved battery of claim 10 in which said aqueous electrolyte includes ammonium chloride, zinc chloride and mercuric chloride.

12. The improved primary battery of claim 1 in which said inorganic additive is selected as a material nonreactive with said aqueous electrolyte.

13. In a planar primary battery of a variety having at least one cell including positive and negative electrodes and a planar electrolyte ion permeable separator positioned therebetween, the improvement comprising:
a positive electrode including:
a planar cathode current collector carrying on one surface, in order, a first cathode stratum comprising a particulate dispersion of cathode mix particles in a binder matrix, and
a second cathode stratum comprising a slurry of particulate cathode mix particles and a substantially nonconducting particulate inorganic additive disposed within aqueous electrolyte.

14. The improved primary battery of claim 13 in which said particulate inorganic additive of said second cathode stratum is titanium dioxide.

15. The improved primary battery of claim 14 in which said second cathode stratum is characterized by the absence of a hydrophilic polymer binder agent.

16. In a planar primary battery of a variety having at least one cell including positive and negative electrodes and a planar electrolyte ion permeable separator positioned therebetween, the improvement comprising:
a negative electrode including:
a planar anode current collector carrying on one surface, in order, a first anode stratum comprising a particulate dispersion of metallic anode particles in a binder matrix, and
a second anode stratum comprising a slurry of metallic anode particles and a particulate substantially nonconducting inorganic additive disposed within aqueous electrolyte.

17. The improved primary battery of claim 16 in which said particulate inorganic additive of said anode second stratum is titanium dioxide.

18. A planar primary battery comprising at least one cell including, in combination:
a positive electrode comprising a planar cathode current collector carrying, in order, a first cathode stratum comprising a particulate dispersion of manganese dioxide and carbon particles in a binder matrix, and a second cathode stratum comprising a slurry of manganese dioxide and carbon particles in aqueous electrolyte, said slurry including a quantity of titanium dioxide effective to disperse said manganese dioxide and said carbon particles and to promote the adherence of said slurry to said first cathode stratum, and said electrolyte including ammonium chloride and zinc chloride;
a planar negative electrode including a planar anode current collector carrying a zinc anode stratum; and
a planar electrolyte ion permeable separator positioned intermediate said positive and negative electrodes, aqueous electrolyte including ammonium chloride and zinc chloride being present intermediate said separator and said zinc anode stratum.

19. The improved primary battery of claim 18 in which said first cathode stratum manganese dioxide and carbon particles are present, respectively, in a weight-to-weight ratio of about 25:1 and said second cathode stratum manganese dioxide and carbon particles are present, respectively, in a weight-to-weight ratio from between about 6:1 and 12:1.

20. The improved primary battery of claim 19 in which said titanium dioxide is present with respect to said carbon of said slurry in a weight-to-weight ratio of about 4:1.

21. A planar primary battery including at least one cell positioned intermediate the opposed surfaces of a first and a second current collector, and which includes, in combination:
a negative aqueous slurry electrode comprising a substantially uniform particulate dispersion of metallic anode particles and a particulate inorganic additive in aqueous electrolyte, the metallic particles present in a concentration per unit area effective to provide an electrically conductive dispersion, said additive being present in an amount effective as a dispersant promoting adherence of said dispersion with said first collector and the electrolyte present in intimate surface contact with the metallic particles in a concentration effective to provide an ionically conductive dispersion;
a positive aqueous slurry electrode comprising a substantially uniform particulate dispersion of cathodic mix particles and a particulate inorganic additive in a substantially uniform distribution of aqueous electrolyte, the cathodic particles present in a concentration per unit area effective to provide an electrically conductive dispersion, said additive present in an amount effective as a dispersant promoting adherence of said positive electrode dispersion with said second collector, and the electrolyte present in intimate surface contact with the cathodic particles in a concentration effective to provide an ionically conductive dispersion; and
an electrolyte ion permeable separator positioned intermediate the negative and positive electrodes and in contact with said electrolyte of the electrodes.

22. The planar primary battery of claim 21 in which the said particulate inorganic additive of at least one of said slurry electrodes is titanium dioxide.

23. The planar primary battery of claim 22 in which said slurry electrodes are characterized in the absence of a hydrophilic binder agent.

24. The planar primary battery of claim 21 in which said metallic anode particles are zinc; said cathodic mix particles are manganese dioxide and carbon; and said aqueous electrolyte includes ammonium chloride and zinc chloride.

* * * * *